(12) United States Patent
Bell

(10) Patent No.: US 7,536,032 B2
(45) Date of Patent: May 19, 2009

(54) METHOD AND SYSTEM FOR PROCESSING CAPTURED IMAGE INFORMATION IN AN INTERACTIVE VIDEO DISPLAY SYSTEM

(75) Inventor: Matthew Bell, Palo Alto, CA (US)

(73) Assignee: Reactrix Systems, Inc., Redwood Shores, CA (US)

( * ) Notice: Subject to any disclaimer, the term of this patent is extended or adjusted under 35 U.S.C. 154(b) by 677 days.

(21) Appl. No.: 10/974,044

(22) Filed: Oct. 25, 2004

(65) Prior Publication Data

US 2005/0089194 A1 Apr. 28, 2005

Related U.S. Application Data

(60) Provisional application No. 60/514,024, filed on Oct. 24, 2003.

(51) Int. Cl.
*G06K 9/00* (2006.01)
*G06F 3/00* (2006.01)
*G06F 9/00* (2006.01)
*H04N 7/16* (2006.01)

(52) U.S. Cl. ............... 382/107; 382/103; 715/761; 725/135

(58) Field of Classification Search .......... 382/103, 382/107, 149, 236, 218; 348/69, 142, 169, 348/153, 239, 460, 471, 474, 510, 512, 522, 348/51, 52, 177, 191; 725/12, 38, 41, 60, 725/61, 135, 136; 715/761
See application file for complete search history.

(56) References Cited

U.S. PATENT DOCUMENTS

| 4,843,568 | A | 6/1989 | Krueger et al. ............. 364/518 |
| 5,001,558 | A | 3/1991 | Burley et al. ............... 358/113 |
| 5,528,297 | A | 6/1996 | Seegert et al. .............. 348/333 |
| 5,633,691 | A | 5/1997 | Vogeley et al. ............. 348/771 |
| 5,703,637 | A | 12/1997 | Miyazaki et al. ............ 348/53 |

(Continued)

FOREIGN PATENT DOCUMENTS

WO      WO 02/100094      12/2002

OTHER PUBLICATIONS

Ahmed Elgammal, David Harwood, Larry Davis: "Non-parametric Model for Background Subtraction", European Conference on Computer Vision, Dublin, Ireland; Lecture notes on Computer Science, vol. 1843, Jun. 2000, pp. 751-767.

(Continued)

*Primary Examiner*—Abolfazl Tabatabai
(74) *Attorney, Agent, or Firm*—Carr & Ferrell LLP

(57) ABSTRACT

A method and system for processing captured image information in an interactive video display system. In one embodiment, a special learning condition of a captured camera image is detected. The captured camera image is compared to a normal background model image and to a second background model image, wherein the second background model is learned at a faster rate than the normal background model. A vision image is generated based on the comparisons. In another embodiment, an object in the captured image information that does not move for a predetermined time period is detected. A burn-in image comprising the object is generated, wherein the burn-in image is operable to allow a vision system of the interactive video display system to classify the object as background.

19 Claims, 3 Drawing Sheets

U.S. PATENT DOCUMENTS

| | | | | |
|---|---|---|---|---|
| 5,882,204 | A | 3/1999 | Iannazo et al. | 434/251 |
| 5,953,152 | A | 9/1999 | Hewlett | 359/298 |
| 5,969,754 | A | 10/1999 | Zeman | 348/136 |
| 5,982,352 | A * | 11/1999 | Pryor | 345/156 |
| 6,075,895 | A | 6/2000 | Qiao et al. | 382/218 |
| 6,088,612 | A | 7/2000 | Blair | |
| 6,166,744 | A | 12/2000 | Jaszlies et al. | 345/435 |
| 6,198,844 | B1 | 3/2001 | Nomura | |
| 6,308,565 | B1 | 10/2001 | French et al. | 73/379.04 |
| 6,353,428 | B1 | 3/2002 | Maggioni et al. | 345/157 |
| 6,400,374 | B2 | 6/2002 | Lanier | 345/630 |
| 6,414,672 | B2 * | 7/2002 | Rekimoto et al. | 345/173 |
| 6,454,419 | B2 | 9/2002 | Kitazawa | 353/122 |
| 6,501,515 | B1 | 12/2002 | Iwamura | 348/734 |
| 6,545,706 | B1 * | 4/2003 | Edwards et al. | 348/169 |
| 6,598,978 | B2 | 7/2003 | Hasegawa | 353/42 |
| 6,658,150 | B2 * | 12/2003 | Tsuji et al. | 382/218 |
| 6,912,313 | B2 * | 6/2005 | Li | 382/219 |
| 6,975,360 | B2 | 12/2005 | Slatter | |
| 6,999,600 | B2 * | 2/2006 | Venetianer et al. | 382/103 |
| 7,158,676 | B1 * | 1/2007 | Rainsford | 382/190 |
| 7,190,832 | B2 * | 3/2007 | Frost et al. | 382/173 |
| 7,262,874 | B2 * | 8/2007 | Suzuki | 358/1.15 |
| 2005/0088407 | A1 | 4/2005 | Bell | |

OTHER PUBLICATIONS

Mathieu Lamarre, James J. Clark: "Background subtraction using competing models in the block-DCT domain", Pattern Recognition, 2002. Proceedings. 16$^{TH}$ International Conference on Quebec City, Que., Canada Aug. 11-15, 2002, Los Alamitos, CA, USA, IEEE Commathieu Lamarre, James J. Clark: "Background subtraction using competing models in the block-DCT domain", Pattern Recognition, 2002. Proceedings. 16$^{TH}$ International Conference on Quebec City, Que., Canada Aug. 11-15, 2002, Los Alamitos, CA, USA, IEEE Comput, Soc, US, vol. 1, Aug. 11, 2002, pp. 299-302.

Chris Stauffer, W. Eric L. Grimson: "Learning Patterns of Activity Using Real-Time Tracking" IEEE Transaction on Pattern Analysis and Machine Intelligence, IEEE service center, Los Alamitos, CA, US, vol. 22, No. 8, Aug. 2000, pp. 747-757.

Michael Harville, Gaile Gordon, John Woodfill: "Foreground Segmentation Using Adaptive Mixture Models in Color and Depth", Proceedings IEEE Workshop on Detection and Recognition of Events in Video IEEE Comput. Soc Los Alamitos, CA, USA, 2001, pp. 3-11.

PD Crouser, MD Bethea, FL Merat "Unattenuated tracer particle extraction through time-averaged, background image subtraction with outlier rejection," Experiments in Fluids, 22, 1997, 220-228, Springer-Verlag.

J Wang, HL Eng, AH Kam, WY Yau "Specular Reflection Removal for Human Detection under Aquatic Environment" 2004 IEEE Conference on Computer Vision and Pattern Recognition Workshop (CVPRW'04) vol. 8 p. 130.

P Tan, S Lin, L Quan, HY Shum "Highlight Removal by Illumination-Constrained Inpainting," Ninth IEEE International Conference on Computer Vision, 2003.

F Vogt, D Paulus, H Niemann "Highlight substitution in light fields", IEEE International Conference on Image Processing 2002.

* cited by examiner

“METHOD AND SYSTEM FOR PROCESSING CAPTURED IMAGE INFORMATION IN AN INTERACTIVE VIDEO DISPLAY SYSTEM”

CROSS-REFERENCE TO RELATED APPLICATION

This application claims priority from co-pending U.S. Provisional Patent Application No. 60/514,024, filed on Oct. 24, 2003, entitled "METHOD AND SYSTEM FOR PROCESSING CAPTURED IMAGE INFORMATION IN AN INTERACTIVE VIDEO DISPLAY SYSTEM," by Bell, and assigned to the assignee of the present application, which is herein incorporated by reference.

FIELD OF INVENTION

The present invention relates to the field of visual electronic displays. Specifically, embodiments of the present invention relate to a method and system for processing captured image information in an interactive video display system.

BACKGROUND OF THE INVENTION

Recent technological advancements have led to the creation of a new interactive medium, the interactive video display system. Interactive video display systems allow real-time unencumbered human interactions with video displays. Natural physical motions by human users are captured by a computer vision system and used to drive visual effects. The computer vision system usually uses images captured by a video camera as input and has software processes that gather real-time information about people and other objects in the scene viewed by the camera.

One type of vision system creates a background model for distinguishing between foreground and background objects of captured images. The real world environment is very dynamic. As a result, the background model developed from the camera input image may vary over time. For example, the overall lighting of the image viewed by the camera can change, scuff marks or other discolorations can appear, objects may be left on the screen, and specular reflected light from the sun or other sources can move or change, among other things. Consequently, the vision system needs to distinguish important changes in the image from other ones.

In certain situations, the vision system may be subjected to rapid environmental changes that effect the captured image. Such rapid changes can occur, for example, due to people turning lights on and off in a room as well as the sun going behind a cloud, a janitor cleaning the screen, or a change in the display surface material. Since most lighting changes affect the entire screen, the effect on the vision system as described so far would be catastrophic. For instance, with typical parameter settings, the entire screen would appear as foreground for several minutes, causing whatever software using the vision output image to behave in an unusable and erroneous manner.

In other situations, the vision system may treat an object as a foreground object when it should be treated as part of the background. For example, if a person sets an object down, and the object does not move for several minutes, the vision system still considers the object as part of the foreground until it is slowly learned into the background. As such, the vision system continues to react to the object is if it were in the foreground, distracting the viewers.

SUMMARY OF THE INVENTION

Various embodiments of the present invention, a method and system for processing captured image information in an interactive video display system, are described herein. In one embodiment, a rapid learning condition of a captured camera image is detected. In one embodiment, the rapid learning condition is detected in response to determining that a predetermined percentage of pixels of a foreground/background distinction image (also referred to as a vision image) are foreground pixels. In another embodiment, the rapid learning condition is detected in response to determining that at least a portion of pixels of an image composed of the absolute value difference between the camera image and a background model have a value exceeding a threshold for a particular length of time.

More specifically, captured camera image is compared to a normal background model image and is compared to a second background model image, wherein the second background model is learned at a faster rate than the normal background model. In one embodiment, the second background model is generated by updating a history data structure of the second background model at a faster rate than a history data structure of the normal background model. In one embodiment, the comparison of the captured camera image to the normal background model image generates a first output image and the comparison of the captured camera image to the second background model image generates a second output image. In one embodiment, the first output image and the second output image and are black and white images identifying a foreground portion and a background portion of the captured camera image.

A vision output image is generated based on the comparison of captured camera image to the normal background model image and the comparison of captured camera image to the second background model image. In one embodiment, the vision image is generated by performing a logical AND operation on the first output image and the second output image.

In another embodiment, an object is detected from captured image information that does not move for a predetermined time period. In one embodiment, at least one pixel corresponding to the object is classified as a burn-in pixel if the pixel is a foreground pixel, as defined by the vision system, for the predetermined time period. In another embodiment, at least one pixel corresponding to the object is classified as a burn-in pixel if the pixel is a foreground pixel for a particular portion of the predetermined time period. In one embodiment, detecting the object includes updating a memory image for each foreground-background distinction image produced by the vision system, wherein a foreground pixel is stored as a non-zero value. An accumulation image is updated with the memory image, wherein the memory image is added to the accumulation image. A pixel is identified as a burn-in pixel if a value of the pixel exceeds a threshold.

A burn-in image comprising the object is generated, wherein the burn-in image is operable to allow a vision system of the interactive video display system to classify the object as background. In one embodiment, burned-in pixels of the burn-in image are represented with a "1" mask, wherein the burn-in pixels correspond to the object, and the remaining pixels of the burn-in image are represented with a "0" mask. It is appreciated that the selected binary mask values can be swapped.

In one embodiment, a modified vision system output image is generated by setting all pixels in the vision output image that are defined as burned-in in the burn-in image to background. In one embodiment, a logical AND operation is performed on the burn-in image and the foreground-background distinction image to generate the vision system's output image.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1A:
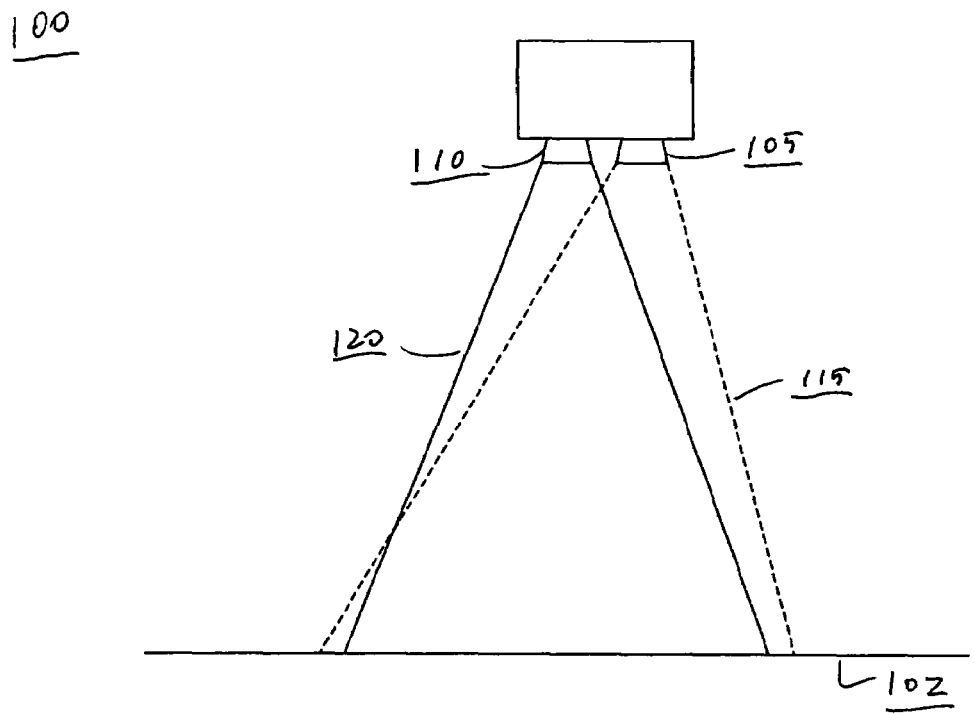
FIG. 1A illustrates a projection interactive video display system in accordance with an embodiment of the present invention.

Reference will now be made in detail to various embodiments of the invention, an electronic device for monitoring the presence of objects around a second electronic device, examples of which are illustrated in the accompanying drawings. While the invention will be described in conjunction with these embodiments, it is understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, it will be recognized by one of ordinary skill in the art that the invention may be practiced without these specific details. In other instances, well known methods, procedures, components, and circuits have not been described in detail as not to unnecessarily obscure aspects of the invention.

Some portions of the detailed descriptions, which follow, are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "detecting" or "comparing" or "generating" or "performing" or "classifying" or "representing" or "transmitting" or "updating" or "identifying" or the like, refer to the action and processes of an electronic system (e.g., projection interactive video display system 100 of FIG. 1A), or similar electronic computing device, that manipulates and transforms data represented as physical (electronic) quantities within the electronic device's registers and memories into other data similarly represented as physical quantities within the electronic device memories or registers or other such information storage, transmission or display devices.

Various embodiments of the present invention in the form of one or more exemplary embodiments will now be described. The described embodiments may be implemented on an interactive video display system including a vision system that captures and processes information relating to a scene. The processed information is used to generate certain visual effects that are then displayed to human users via an interactive display device. Human users are able to interact with such visual effects on a real-time basis.

FIG. 1A illustrates a projection interactive video display system 100 in accordance with an embodiment of the present invention. Projection interactive video display system 100 uses a camera 105, a projector 110 that projects an image 120 onto the interactive space 115 of surface 102, and a local computer (not shown) that takes as input the image of camera 105 and outputs a video image to projector 110.

The local computer processes the camera 105 input to discern on a pixel-by-pixel basis what portions of the volume in front of surface 102 (e.g., interactive space 115) are occupied by people (or moving objects) and what portions of surface 102 are background. The local computer may accomplish this by developing several evolving models of what the background is believed to look like, and then comparing its concepts of the background to what camera 105 is currently imaging. Alternatively, components of the local computer that process camera 105 input are collectively known as the vision system. Various embodiments of projection interactive video display system 100 and the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. Provisional Patent Application No. 60/514,024, filed on Oct. 24, 2003, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

Figure 1B:
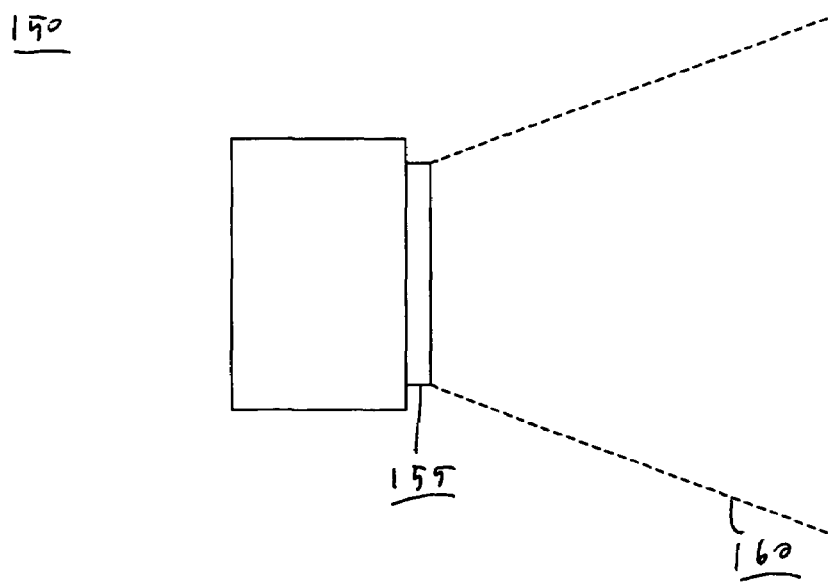
FIG. 1B illustrates a self-contained interactive video display system in accordance with an embodiment of the present invention.

FIG. 1B illustrates a self-contained interactive video display system 150 in accordance with an embodiment of the present invention. Self-contained interactive video display system 150 displays an image onto display screen 155, and uses a camera (not shown) to detect people and objects in interactive space 160. A local computer, also referred to as the image system, takes as input the image of the camera and outputs a video image to display screen 155.

Various embodiments of self-contained interactive video display system 150 are described in co-pending U.S. patent application Ser. No. 10/946,263, filed on Sep. 20, 2004, entitled "SELF-CONTAINED INTERACTIVE VIDEO DISPLAY SYSTEM," by Bell et al., and assigned to the assignee of the present application, co-pending U.S. patent application Ser. No. 10/946,084, filed on Sep. 20, 2004, entitled "SELF-CONTAINED INTERACTIVE VIDEO DISPLAY SYSTEM," by Bell, and assigned to the assignee of the present application, and co-pending U.S. patent application Ser. No. 10/946,414 filed on Sep. 20, 2004, entitled "INTERACTIVE VIDEO WINDOW DISPLAY SYSTEM," by Bell, and assigned to the assignee of the present application, all of which are herein incorporated by reference. Furthermore, various embodiments of the vision system are described in co-pending U.S. patent application Ser. No. 10/160,217, filed on May 28, 2002, entitled "INTERACTIVE VIDEO DISPLAY SYSTEM," by Bell, and assigned to the assignee of the present application, and in co-pending U.S. Provisional Patent Application No. 60/514,024, filed on Oct. 24, 2003, entitled "METHOD AND SYSTEM FOR PROCESSING CAPTURED IMAGE INFORMATION IN AN INTERACTIVE VIDEO SYSTEM," by Bell, and assigned to the assignee of the present application, both of which are herein incorporated by reference.

Various embodiments of the present invention are described herein. According to one embodiment of the interactive video display system (e.g., projection interactive video display system 100 of FIG. 1A), there is an input image from a monochrome camera (e.g., camera 105 of FIG. 1A) and a computer vision system that is able to separate foreground objects of interest (e.g., people) from the background of the input image in real time so that the location and outline of the foreground objects can serve as input to an interactive application.

The camera input image is an image representing a real world scene viewed by the camera. This real world scene contains a static background of unknown brightness and appearance as well as various foreground objects that are able to move, such as, people and objects held or moved by people. The camera input image may be manipulated or cropped so that the area viewed by the camera corresponds to the boundaries of a display.

The computer vision system outputs a foreground/background distinction image that corresponds to the camera input image. Each pixel in this image is capable of assuming one of two values: one value for foreground and another value for background. This pixel's value represents whether the vision system determines the pixel with the same position in the camera input image is foreground or background. In one exemplary embodiment, the foreground/background distinction image is an 8-bit grayscale image, with a pixel value of "0" for background and a pixel value of "255" for foreground.

The vision system develops a background model. The background model represents the system's estimate of what the background looks like. This background model essentially corresponds to what the camera input image would look like if there were no foreground objects in it. A foreground object of interest is presumed to differ in brightness from the background. Thus, in order to find foreground objects at each time step, a "difference image" is created. The difference image is the result of subtracting the camera input image from the background model image. For each pixel in the difference image, if the absolute value of the difference is larger than a particular threshold, then that pixel is classified as foreground; otherwise, it is classified as background. This difference threshold may vary depending on the background's brightness.

The camera input image may be preprocessed before being input into the vision system. For example, the image may be blurred slightly to reduce noise or gamma corrected to increase or decrease the vision system's sensitivity to dark or light areas. In many cases, the camera input image may be cropped, linearly transformed, or otherwise calibrated. Other well-known ways and/or methods to preprocess the camera input image can also be used.

Dynamic Background Conditions

In one embodiment, the vision system is able to change its background model over time to deal with dynamic background conditions. Camera input images at various points in time are stored by the vision system. By storing previously captured camera input images, the vision system can then examine past brightness levels at each pixel to make an optimal estimate as to the present brightness value of the background at that pixel, in one implementation, a "history" data structure stores camera input images at regular intervals of time. This data structure is of finite size and is updated regularly. For example, once a fixed number of image snapshots are filled, the oldest snapshot is erased when a new camera input image is recorded. The number of snapshots and the time interval between recording new snapshots are both tunable parameters that affect the system's length of "memory" about the past and the rate at which the system learns new features. Based on the disclosure and teachings provided herein, a person of ordinary skill in the art will appreciate how to manipulate the tunable parameters to achieve the desired results.

The vision system can analyze the history data structure to make a model image of the background using a number of approaches. In one embodiment, taking the median of the brightness values recorded at a particular pixel in the history data structure gives a good estimate of the background's brightness. In most cases, the brightness values observed at a pixel over time correspond to a mix of foreground and background objects. At this pixel, the occurrences of background objects usually tend to have similar brightness values, while the occurrences of foreground objects tend to have a larger variety of brightness values. This is because foreground objects have a variety of colors and tend to be mobile. By taking the median, one of the intermediate brightness values most commonly observed at that pixel can be estimated, which is likely to correspond to the background brightness. If the background changes brightness, then the system will eventually switch to the new brightness value as several instances of that brightness begin to appear in the history data structure. The amount of time required for this switch to occur depends on the number of snapshots in the history data structure and the time interval between updates to the history data structure.

By using the median instead of the average, it is ensured that the brightness value chosen for the background is one that has actually been seen in the snapshots. In addition, using the median allows the system to switch rapidly and smoothly between two potential states for the background. For example, suppose that someone periodically opens and closes a door, causing a change in terms of the brightness of some part of the background. The snapshots will have a mixture of light and dark background. If the median is used, then the background model will quickly pop between light and dark as soon as there is a majority of light or dark in the past snapshots.

In other embodiments, several alternatives can be used instead of the median. For example, a set of brightness intervals (regular or irregular, overlapping or non-overlapping, with fuzzy or sharp boundaries) can be created that span the range of possible brightnesses, then the number of past brightness values at a given pixel that fall into each interval is counted. The interval with the highest counts could then define the background model's brightness value at that pixel.

The background model could have two brightness values in the case where two intervals have high counts—this corresponds to a background state that switches between two brightness values. As another alternative, the Gaussian distribution that best fits the majority of brightness data can be calculated. The center of this Gaussian would then be the background model's brightness value for that pixel.

The median, interval, Gaussian, or other such calculation processes can be modified as appropriate to further improve the estimate of the background's brightness. For example, a subset of the past pixel brightness values can be used that are more likely to correspond to background brightness values. The subset of snapshots that is chosen includes ones that do not vary significantly in brightness from the previous snapshot. It can be assumed that a non-constant brightness is an indication that people are moving in and out of a particular area. Thus, the value from a non-constant-brightness period (e.g., foreground objects) is ignored to prevent any erroneous contribution to the background calculation. As long as foreground objects keep moving in the image, they will never contribute to a background median calculation.

There are a number of embodiments that can be used to define a "significant change in brightness" between snapshots. In one embodiment, a maximum absolute value for the brightness difference between the pixel value at a given snapshot and the pixel value at the previous snapshot is defined. If the difference is greater than the maximum absolute value, then it is determined that a significant change in brightness has occurred. The subset of pixel brightness values chosen may be different for different pixels. In some cases, there may be no past brightness values at a given pixel in which the brightness did not change significantly. In this case, all past brightness values for that pixel may be used.

In another embodiment, the importance of past pixel values can be weighted when calculating the median or modified median. For example, the most recent pixel values can be weighed more heavily to place more emphasis on recent changes in the background.

Practical Considerations

In one embodiment, the computer that controls the vision system may also be controlling all the software for generating the visual effects. As a result, it should be ensured that the processing of each image by the vision system takes a small and consistent amount of computing time, or else the display will appear jerky.

The primary time-consuming intermittent operations in the vision system are adding a new snapshot to the history data structure and recalculating the background model. In order to smooth this out, only a specific number of pixels are allowed to be updated during each iteration through the vision system instead of adding one whole snapshot every several seconds. Thus, if there are 10 seconds between snapshots and a frame rate of 30 frames per second, the vision system would update 1/300 of the history data structure and background model with each iteration. Over the course of 10 seconds, the history data structure would receive one new snapshot and the background model would be fully updated.

Since most methods of analyzing the history data structure to develop the background model examine the full history of a specific pixel, the history data structure may be organized so that the past values for each pixel are stored together. Thus, the full history data structure would be an array of pixel history arrays. This would speed up calculations on typical processor architectures that have a small or medium cache.

Rapid Learning Mode

In one embodiment, the vision system is able to deal with rapid as well as slow changes to the background of the image. Rapid changes in the background of the image are accounted for by adding a special learning mode, also referred to as a rapid learning mode, to the vision system that provides special behavior during times of rapid background change. In one embodiment, the vision system includes two components that are designed to carry out the rapid learning mode. The first component recognizes when to have the rapid learning mode—the start and end of the time period for which the normal vision system cannot make accurate foreground-background distinctions. The second component is a second background model that provides an alternative foreground-background distinction, which is used until the normal vision system can catch up to the new background.

The rapid learning mode can be implemented in a number of ways. In general, choices for the first component can be mixed and matched with choices for the second component.

Figure 2:
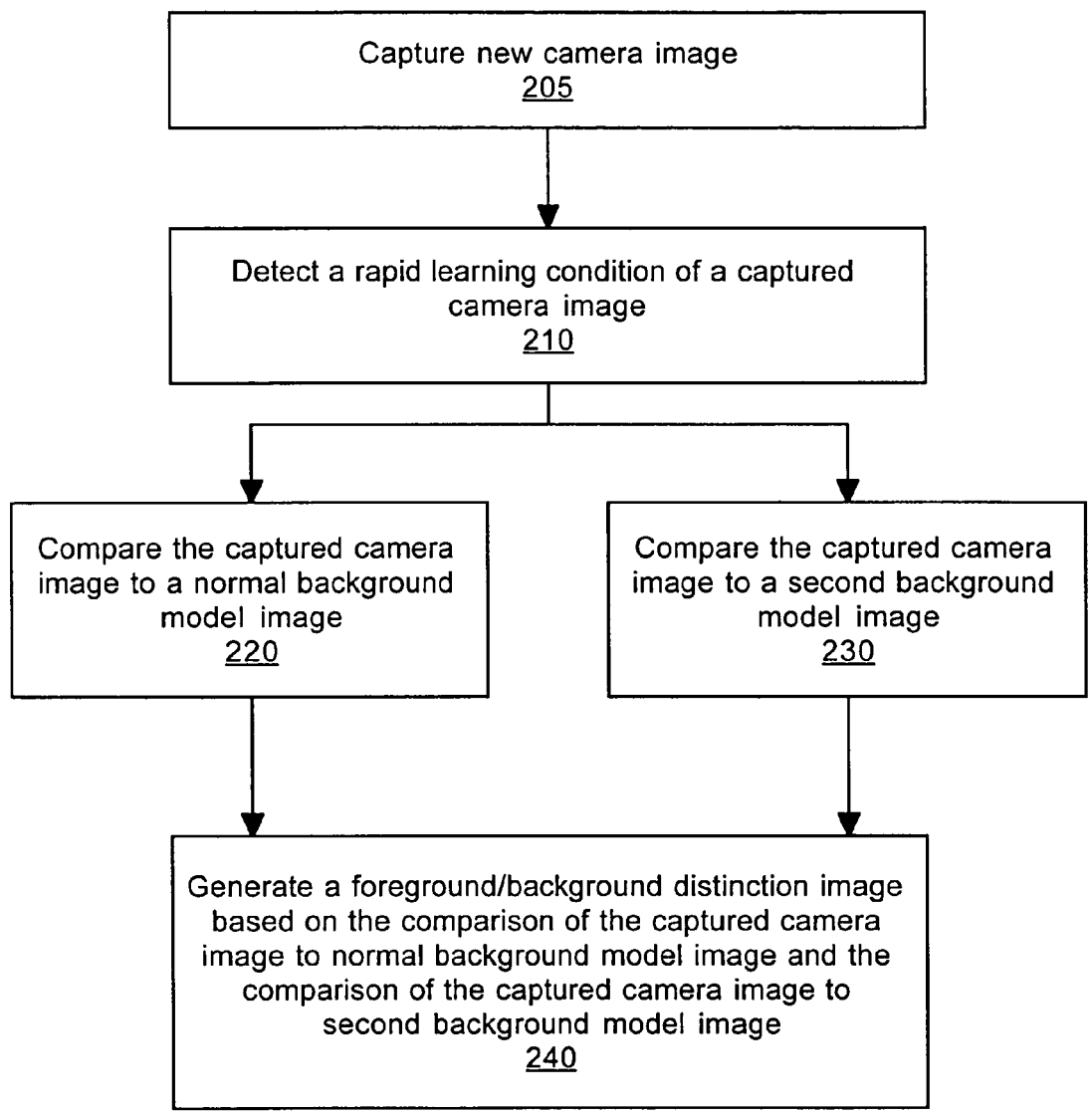
FIG. 2 illustrates a process for processing captured image information of an interactive video display system using a rapid learning condition, in accordance with an embodiment of the present invention.

FIG. 2 illustrates a computer-controlled process 200 for processing captured image information of an interactive video display system using a rapid learning condition, in accordance with an embodiment of the present invention. In one embodiment, process 200 is carried out by processors and electrical components (e.g., an interactive video display system) under the control of computer readable and computer executable instructions, such as the described vision system. Although specific steps are disclosed in process 200, such steps are exemplary. That is, the embodiments of the present invention are well suited to performing various other steps or variations of the steps recited in FIG. 2.

At step 205 of process 200, a new camera image is captured. At step 210, a rapid learning condition of a captured camera image is detected. Detecting when to start and end the rapid learning mode can be implemented in several ways. For example, in most display settings, the assumption can be made that it is rare to get a vision output image where, for instance, 80% or more of the pixels are foreground unless there is some misclassification of background as foreground. Even on a crowded reactive display, it is rare for people to cover so much of the screen. As a result, a vision-based trigger can be implemented such that the rapid learning mode begins if more than a certain percentage of the vision output signal is foreground. To prevent accidental triggering of the rapid learning mode (e.g., by an object(s) that temporarily covers the screen), the percentage of foreground may need to exceed a threshold for a specified period of time.

Alternatively, accidental triggering can be minimized by determining whether at least a specified portion of the pixels of the difference image (e.g., the difference between the camera input image and the normal background model) have a value exceeding a particular threshold for a particular length of time. In addition, the camera input image can be analyzed more directly, looking for rapid changes (over time) in the average or median of the camera input image or some subset thereof. If the change in the average or median of the image is large and sustained for a sufficient period of time, the rapid learning mode can be triggered or initiated.

There is a similar array of options for ending the rapid learning mode. Rapid learning mode can end when the normal background model's vision image's percentage of foreground drops below a specified value, or drops below that specified value for a specified period of time. This is an indication that the normal background model has learned the new background.

Alternatively, knowing the maximum amount of time the vision system would take to learn a new background, the rapid learning mode can be disengaged after that specified period of time.

In another approach, the rapid learning mode can be terminated by determining whether a specified percentage of the pixels of the difference image (e.g., the difference between the camera input image and the background model) have a value below a particular threshold, or optionally, such value is below the threshold for a particular length of time.

In addition, the rapid learning mode could end when the average or median of the camera input image or some subset thereof stays constant for a specified period of time.

A number of choices are available for the second component—the implementation of rapid learning mode. For example, the vision system may blank out, classifying everything as background. The projector may fade to black or display non-interactive content or a "technical difficulties" message.

Alternatively, the vision system can be directed to display only motion-based images, in which only objects in motion are visible during rapid learning mode. One implementation of the foregoing is to subtract the current camera input image from the previous (or another recent) camera input image. Any pixels in this difference image that have a value above a particular threshold are classified as foreground, the remaining pixels are classified as background. This implementation would catch the edges of moving objects while they remain in motion. In one embodiment, as shown at step 220, the captured camera image is compared to a normal background model image.

A second, faster-learning background model, as shown at step 230 can provide the vision output image during rapid learning mode. This second background model would be separate, but similar or identical in structure, to the normal background model described above and used in step 220. However, its history data structure would be updated much more frequently, perhaps with a new snapshot every couple of seconds. As a result, this background model could learn changes to the background in a few seconds instead of minutes. To further increase its speed of learning at the beginning of rapid learning mode, this background model could have its history data structure emptied either every few seconds or at the start of rapid learning mode. As rapid learning mode continues, the learning rate of this background model may be slowed down under the assumption that the background brightness has begun to stabilize. The learning rate can be slowed by increasing the number of seconds between snapshots. As shown at step 230, the captured camera image is compared to a second background model image, wherein the second background model is learned at a faster rate than the normal background model. It should be appreciated that steps 220 and 230 may be performed on any order, or in parallel.

As shown at step 240, a vision image is generated based on the comparison of the captured camera image to the normal background model image and the comparison of the captured camera image to the second background model image. The learning rate of the normal background model can be sped up in the same way so that it can become accustomed to the new background slightly faster. In one embodiment, the output of comparing the camera image to the second background model in rapid learning mode can be used as the vision output image. In another embodiment, a vision image is generated based on the comparison of the captured camera image to the normal background model image and the comparison of the captured camera image to the second background model image. For example, the logical "AND" of the vision system's output in rapid learning mode and the normal vision system's output can be used as the vision output image.

Optionally, there may be two or more background models, each with different learning rates. The different vision systems can be used to generate the output vision image based on which one (or logical combination such as an union or intersection) of the images appears to provide the most likely model of the background. Interestingly, the vision system that has the most likely model of the background during rapid learning mode is often the one that classifies as little as possible of its vision output image as foreground.

Alternatively, just one vision system can be used with a change in the time scale over which the background model is computed. For example, at the beginning of rapid learning mode, the vision system can be modified to just look at a few of the most recent snapshots to compute the background model. At that time, the learning rate of the vision system can be increased over its normal rate by decreasing the time interval between snapshots. As rapid learning mode continues, the number of snapshots examined and/or the time interval between them could be increased. In one embodiment, if background levels continue to change rapidly in the middle of rapid learning mode, rapid learning mode may be re-started.

Burn-In

In one embodiment, the vision system is able to rapidly learn changes to a small piece of the background. For example, if a person makes a scuff mark on the screen viewed by the camera, the vision system would start classifying it as background as quickly as possible. Background learning can be sped up by changing the parameters of the history data structure so that the time interval is short and the number of snapshots is small, allowing changes to be learned within a short period of time (e.g., a few seconds).

Sped-up background learning, however, has an undesirable side effect: if an object enters the screen and remains absolutely still long enough for the camera to learn it, the object will leave a foreground "ghost" when it moves again. This is because the system, having learned the image of the object as part of the background, would take the difference between the camera's view of the empty screen and the background model with the object included in it. The area formerly occupied by the object would have a large enough difference to be classified as foreground.

Figure 3:
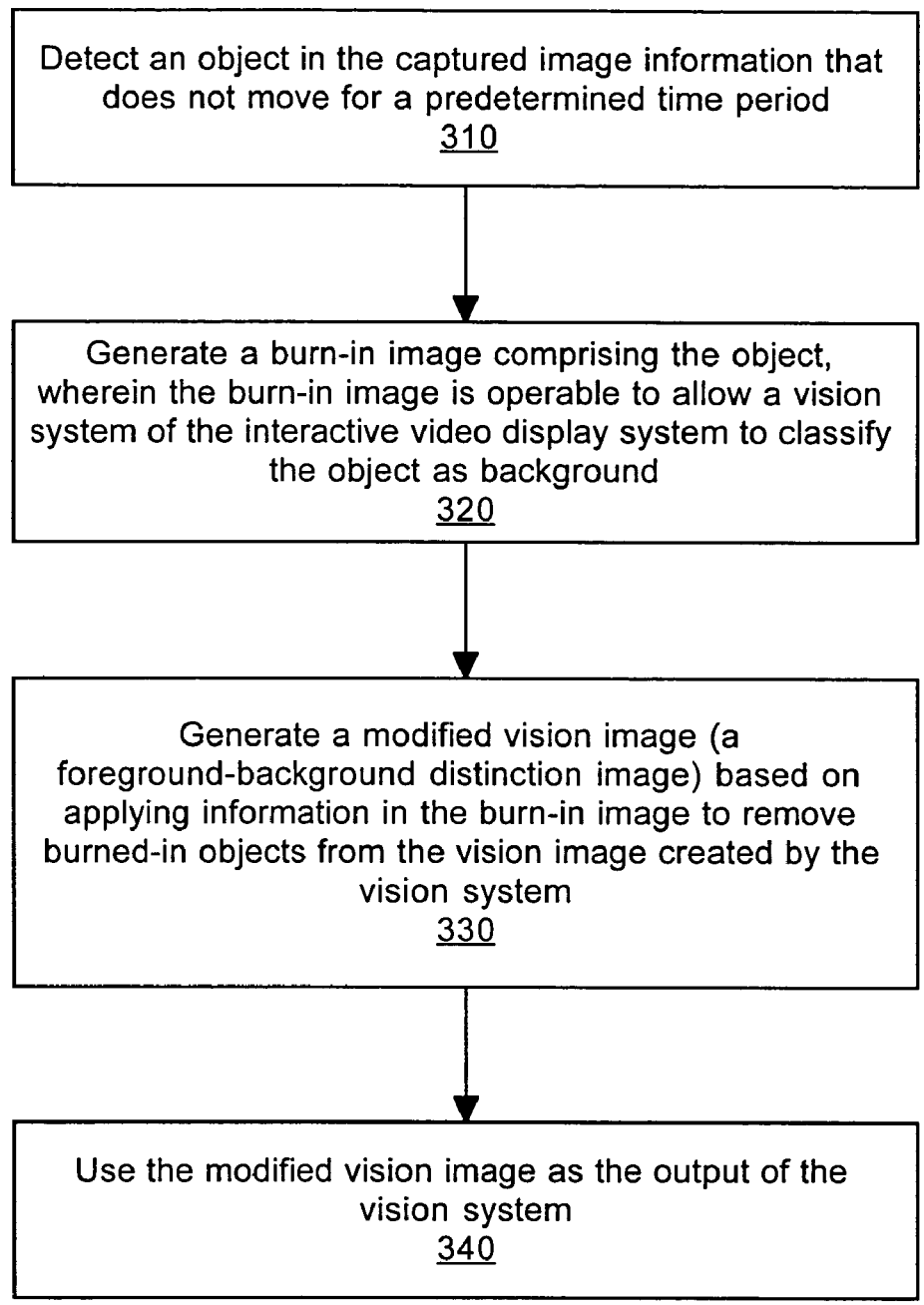
FIG. 3 illustrates a process for processing captured image information of an interactive video display system using a burn-in image, in accordance with an embodiment of the present invention.

In one embodiment, the vision system uses a technique called burn-in in order to rapidly learn static objects without causing the foregoing "ghosting" problem. FIG. 3 illustrates a computer-controlled process 300 for processing captured image information of an interactive video display system using a burn-in image, in accordance with an embodiment of the present invention. In one embodiment, process 300 is carried out by processors and electrical components (e.g., an interactive video display system) under the control of computer readable and computer executable instructions, such as interactive video display system. Although specific steps are disclosed in process 300, such steps are exemplary. That is, the embodiments of the present invention are well suited to performing various other steps or variations of the steps recited in FIG. 3.

There are a variety of ways to implement burn-in, but the basic concept is that the vision output is post-processed so that any pixel that has been classified as foreground in almost every image for a specified period of time (e.g., a few seconds) is marked as "burned-in". In one embodiment, as shown at step 310 of process 300, an object of the captured image information that does not move for a predetermined time period is detected.

At step 320, a burn-in image including the object is generated, wherein the burn-in image is operable to allow a vision system of the interactive video. display system to classify the object as background. If a "burned-in" pixel is classified as background in almost every vision output for a (usually shorter) period of time, then the pixel stops being marked as "burned-in". Once all pixels are classified as to whether they are "burned-in" or not, the vision output image then has all "burned-in" pixels automatically re-classified as background. The marking of pixels as "burned-in" or not "burned-in" is done entirely in post-processing to the regular vision calculations. Thus, burn-in determination does not affect the history data structure(s) of the background model(s). The periods of time for a foreground pixel to become "burned-in" and a background pixel to be declassified as being "burned-in" can both be parameterized; for example, in some typical situations, the former is around 10 seconds, while the latter is around 0.3 seconds, however, different intervals can be used. These parameters are referred to as burn_in_time and unburn_out_time. The ultimate effect achieved here is that objects that stay still for more than a few seconds will be reclassified as background until they are moved. When such objects move, however, there is no problem with ghosting.

Suppose that the vision output image has foreground pixels marked with a nonzero value and background pixels marked with a zero value. Further suppose that a separate "burned-in classification" image is used to represent which pixels are burned in by marking burned-in pixels with a "1" mask and all other pixels with a "0" mask. In one embodiment, as shown at step 330, a modified vision image, with burned-in areas removed, is generated. In one embodiment, the vision output image can be computed by taking the logical "AND" of the burned-in classification image and the vision output image. At step 340, the modified vision image is used as the output of the vision system.

In practicality, pixels that are in the vision image may flicker or move slightly. However, the technique for identifying burned-in pixels can take this into account. First, a pixel in the vision output image can be considered foreground by the burn-in process if it was classified as foreground in at least one vision output image from the most recent few images. Thus, pixels that flicker quickly between background and foreground will eventually become burned-in, while pixels that have longer periods as background will not become burned-in. The length of time over which a pixel in the vision output image has to be foreground at least once can be parameterized, for example, in some typical situations, it is around 0.3 seconds. This parameter is referred to as foreground_memory_time. In order to deal with slight movement of foreground pixels, the regions of burned-in pixels can be expanded such that any pixel that is adjacent or otherwise near a burned-in pixel is treated identically to the burned-in pixels. One way this is accomplished is by applying the image-processing function "dilate" one or more times to the classified burned-in pixels in the image. For reference, the "dilate" function turns on all pixels that are horizontally, vertically (and optionally, diagonally) adjacent to pixels that are on. In this case, pixels that are on would represent the burned-in pixels.

A number of approaches can be used to implement burn-in as described so far. In one approach, the frame rate is defined to be the number of camera input images received per second. A persistent "memory" image is created which will be used to determine whether each vision image pixel was foreground at least once within the last few time steps. Upon creation, all pixels are set to "0". Every time a new vision output image is produced, the memory image is updated. For each pixel in the vision output image, the following rules are applied—if the pixel is foreground, the memory image pixel's value is set to equal to (foreground_memory_time*frame rate); if the pixel is background, one (1) is subtracted from the memory image pixel's value and if the value is less than zero (0), the value is set to zero (0). Then, pixels in the memory image will be zero (0) if the burn-in process is to treat them as background, and nonzero if the burn-in process is to treat them as foreground.

Then, an 8-bit mask is created out of the memory image. Each pixel in this mask is two hundred fifty-five (255) if the memory image's pixel is nonzero and zero (0) if the memory image's pixel is zero (0). The dilate function is then applied to the mask. A typical value for dilation is one (1) pixel.

Next, a persistent 16-bit "accumulation" image is created which will be used to track which pixels should be burned in. Each pixel in this image has an initial value of zero (0). Parameters threshold_value (pixels with a value higher than this are considered burned-in) and a somewhat higher maximum_value (the highest value a pixel in this image can have) are established.

For each pixel in the mask image, the following rules are applied. If the mask image pixel is zero (0), the result based on the equation, (threshold_value/(unburn_out_time*frame rate)), is subtracted from the value of the corresponding pixel in the accumulation image; if the value goes below zero (0), the value is set to zero (0); if the mask image pixel is two hundred and fifty-five (255), the result based on the equation, (threshold_value/(burn_in_time*frame rate)), is added to the value of the corresponding pixel in the accumulation image; and if the value is above maximum_value, the value is set to maximum_value. Then, any pixel in the accumulation image with a value larger than threshold_value is considered to be burned-in. Threshold_value is kept slightly lower than maximum_value to prevent pixels from losing their burned-in status if they are only classified as background for an image or two.

Also note that the unburn_out_time parameter has a slightly different effect than what was described earlier. The identities of burned-in pixels can then be transferred to another 8-bit mask image, with a value of two hundred fifty-five (255) for burned-in pixels and zero (0) for the other pixels. Finally, this mask image is used to mask out the burned-in parts of the vision output image to produce a burned-in vision output image. This can be done, among other ways, by taking the logical AND of these two images.

Post-Processing for Object Interaction

In some cases, it may be desirable to use the vision output image to enable interaction with virtual objects. This interaction can take place when the foreground portions of the vision output image touch or come near the position of a virtual object. Some methods of interaction with virtual objects involve generating an "influence image" from the foreground portions of the vision output image. This influence image includes a series of successively larger outline areas around the foreground, with the foreground itself having the highest brightness value and the successively more distant outline areas having progressively lower brightness values.

This influence image can be created in a variety of ways. For example, a blurring operation or a series of blurring operations are applied to the vision output image, with the foreground at one brightness value and the background at a different brightness value. Gaussian, box blur, or other blurring techniques may be used. Blurring techniques may be combined with other image processing operations, such as the "dilate" operation.

Alternatively, a variety of techniques can be used to compute the distance of each pixel in the image to the nearest foreground pixel, and assign values to each pixel based on that distance, with a lower value for a greater distance. This may take the form of a linear relationship, in which the brightness value has a maximum when the pixel is a foreground pixel, and an amount directly proportional to the distance to the nearest foreground pixel is subtracted from the maximum for all other pixels. The distance may be measured in many ways including, for example, the length of the line between two pixels and the Manhattan distance, which refers to the absolute value of the difference between the pixels' x coordinates plus the absolute value of the difference between the pixels' y coordinates. The resulting images generated by these techniques have the characteristics of an influence image. Additional details relating to the influence image can be found in U.S. patent application Ser. No. 10/160,217 entitled "INTERACTIVE VIDEO DISPLAY SYSTEM" by Matthew Bell, filed May 28, 2002, the disclosure of which is incorporated by reference herein.

The influence image allows interaction with virtual objects through calculations based on its gradient vectors. The direction and length of the gradient vectors in particular areas of this influence image are used to calculate the effect of the foreground (and thus the people or other physical objects it represents) on virtual objects in these particular areas. Since the mathematical concept of a gradient only applies to continuous functions, any one of a variety of gradient approximations designed for discrete images can be used, such as the Sobel filter.

Methods that compute the interaction with a virtual object can use the gradient information in a variety of ways. With most methods, the position and area covered by the virtual object on the screen are first mapped onto the influence image. This mapping defines the set of pixels in the influence image that, are part of the virtual object. The gradient vectors for these pixels (or some subset of them, such as a random sampling, an ordered grid, the outline, or the center) are then determined. The length of each gradient vector can be computed in many ways. These ways include, for example, setting the length to be a constant value, setting it to be proportional to the slope of the influence image at that pixel, and setting it to be proportional to the brightness of the influence image at that pixel.

The gradient vectors can be treated as forces in a physics simulation, with the direction of each gradient vector corresponding to the direction of a force on the virtual object and the length of the gradient vector corresponding to the strength of the force. The direction and strength of these force vectors can be summed or averaged to compute the direction and strength with which the virtual object is pushed. By choosing a center point for the object, the torque on the virtual object can also be calculated. The force and torque on these objects can feed into a physics model in a computer that computes the position, velocity, and acceleration (as well as potentially the rotation and torque) for all virtual objects. This system is useful for many applications including, for example, simulating real-world simulations with virtual analogs of physical objects, such as, a game in which a user can physically kick a virtual soccer ball.

Alternatively, the force or torque could cause other changes to the virtual object, such as, a changed appearance. The change in appearance may depend on the amount and/or direction of the force or torque. For example, the change in appearance could occur if the strength of the force exceeds a given threshold. This system could allow for, among other things, an interface with a virtual button that activates if the user applies enough virtual "force" to it. The strength of force applied to the virtual object may be computed in different ways. For example, the strength of the "force" on the virtual object could be equal to the length of the longest gradient vector within the object.

In an exemplary implementation, the present invention-is implemented using software in the form of control logic, in either an integrated or a modular manner. Alternatively, hardware or a combination of software and hardware can also be used to implement the present invention. Based on the disclosure and teachings provided herein, a person of ordinary skill in the art will know of other ways and/or methods to implement the present invention.

Various embodiments of the present invention, a method for processing captured image information in an interactive video display system, are described herein. In one embodiment, the present invention provides a method for processing captured image information in response to extreme environmental changes, triggering a rapid learning condition. In another embodiment, the present invention provides a method for processing captured image information by generating a burn-in image for treating objects that do not move as part of the background. The various described embodiments provide for the improved performance of an interactive video display system, thereby enhancing the user experience.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

Various embodiments of the invention, a method and system for processing captured image information in an interactive video display system, are thus described. While the present invention has been described in particular embodiments, it should be appreciated that the invention should not be construed as limited by such embodiments, but rather construed according to the below claims.

What is claimed is:

1. A method for adapting to changes in captured camera images in an interactive video display system, the method comprising:
    developing a slow-changing background model and a fast-changing background model, each of the background models based in part on trends in the captured camera images, the models developed at a computing device;
    detecting a background change in one or more of the captured camera images with respect to the slow-changing background model, the background changed captured by a camera;
    determining that the background change exceeds a threshold associated with the slow-changing background model, the determination made by the computing device; and
    generating a vision image using the fast-changing background model as a result of the background change exceeding the threshold, the vision image rendered on a video display.

2. The method of claim 1, wherein the threshold includes a percentage of the camera image being obscured for a specified period of time.

3. The method of claim 1, wherein the threshold includes a specified portion of the pixels in the camera image having a value that exceeds a particular threshold for a particular length of time.

4. The method of claim 1, further comprising:
replacing the slow-changing background model with the fast-changing background model; and
developing a new fast-changing background model to replace the old fast-changing background model.

5. The method of claim 4, wherein the slow-changing background model is replaced with the fast-changing background model once the background change no longer exceeds the threshold.

6. The method of claim 1, further comprising generating a further vision image using the slow-changing background model as a result of the background change no longer exceeding the threshold, the further video image rendered on the video display.

7. The method of claim 6, wherein the threshold includes a percentage of the camera image no longer being obscured for a specified period of time.

8. The method of claim 6, wherein the threshold includes a specified portion of the pixels in the camera image having a value that no longer exceed a particular threshold for a particular length of time.

9. The method of claim 6, wherein the threshold includes a subset of the camera image staying constant for a specified period of time.

10. An interactive display system, the system comprising:
a camera configured to capture images;
a computing device configured to:
developed a slow-changing background model and a fast-changing background model, each of the background models based in part on tends in the images captured from the camera,
detect a background change in one or more of the images captured from the camera with respect to the slow-changing background model, and
determine that the background change exceeds a threshold associated with the slow-changing background model; and
a video display configured to display a vision image generated using the fast-changing background model in response to background change exceeding the threshold.

11. The interactive display system of claim 10, wherein the threshold includes a percentage of the camera image being obscured for a specified period of time.

12. The interactive display system of claim 10, wherein the threshold includes a specified portion of the pixels in the camera image having a value that exceeds a particular threshold for a particular length of time.

13. The interactive display system of claim 10, wherein the computing device is further configured to
replace the slow-changing background model with the fast-changing background model; and
develop a new fast-changing background model to replace the old fast-changing background model.

14. The interactive display system of claim 13, wherein the slow-changing background model is replaced with the fast-changing background model once the background change no longer exceeds the threshold.

15. The interactive display system of claim 10, wherein a further vision image is generated using the slow-changing background model as a result of the background change no longer exceeding the threshold, the further video image rendered on the video display.

16. The interactive display system of claim 15, wherein the threshold includes a percentage of the camera image no longer being obscured for a specified period of time.

17. The interactive display system of claim 15, wherein the threshold includes a specified portion of the pixels in the camera image having a value that no longer exceed a particular threshold for a particular length of time.

18. The interactive display system of claim 15, wherein the threshold includes a subset of the camera image staying constant for a specified period of time.

19. A computer-readable storage medium having embodied thereon a program, the program being executable by a processor to perform a method for adapting to changes in captured camera images, the method comprising:
developing a slow-changing background model and a fast-changing background model, each of the background models based in part on trends in the captured camera images;
detecting a background change in one or more of the captured camera images with respect to the slow-changing background mode;
determining that the background change exceeds a threshold associated with the slow-changing background model; and
generating a vision image using the fast-changing background model as a result of the background change exceeding the threshold.

* * * * *

UNITED STATES PATENT AND TRADEMARK OFFICE
CERTIFICATE OF CORRECTION

PATENT NO. : 7,536,032 B2
APPLICATION NO. : 10/974044
DATED : May 19, 2009
INVENTOR(S) : Matthew Bell Page 1 of 1

It is certified that error appears in the above-identified patent and that said Letters Patent is hereby corrected as shown below:

CLAIM 10

Column 15, line 28, please delete "developed" and insert --develop--.

Signed and Sealed this

Twenty-second Day of December, 2009

David J. Kappos
*Director of the United States Patent and Trademark Office*